Sept. 23, 1941.  E. H. EDWARDS  2,256,602

GYNECOLOGIC INSTRUMENT

Filed April 25, 1939

INVENTOR.
ELLIS H. EDWARDS
BY Harry Lea Dodson.
ATTORNEY.

Patented Sept. 23, 1941

2,256,602

UNITED STATES PATENT OFFICE 2,256,602

GYNECOLOGIC INSTRUMENT

Ellis H. Edwards, Scarsdale, N. Y.

Application April 25, 1939, Serial No. 269,859

5 Claims. (Cl. 128—127)

REISSUED

My invention relates to that class of devices which are designed to facilitate the correct positioning of the diaphragm in the vaginal canal.

My invention has for its principal object to provide a device having a trip feature, which will always release the diaphragm when it is in proper position. Experience has shown, that the diaphragm has to hold on the instrument with sufficient tension, in order for it to be placed in the correct position. As these diaphragms are of various sizes, which correspond to the user the instrument is usually provided with a plurality of hooks intended to receive the edge or rim of the diaphragm. It frequently occurs that the tension is so great that when it is attempted to release the diaphragm from the instrument, that before the diaphragm is released it will have been turned vertically and thus entirely defeat the purpose for which it is intended.

A further object of my invention is to provide an instrument which will put enough tension on the diaphragm to facilitate its introduction in the proper position, but will always release the diaphragm and leave it in the correct position.

A further object is to construct an instrument without any removable parts, so that no part can be mislaid or lost.

A further object is to gauge the teeth to fit all of the usual sizes of the diaphragm.

A further object is to so curve the instrument that it will facilitate proper introduction of the diaphragm into the required position.

My means of accomplishing the foregoing objects may be more fully comprehended by having reference to the accompanying drawing, which is hereunto annexed and is a part of this specification, in which.

Similar reference numerals refer to similar parts throughout the entire specification.

Figure 1:
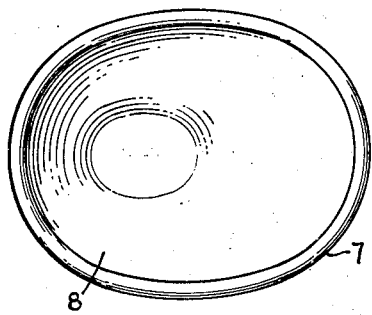
Fig. 1 is a plan view of a standard diaphragm constructed for this purpose.
Figure 2:
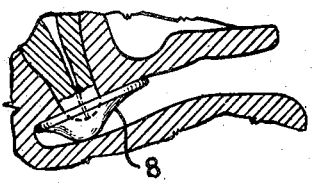
Fig. 2 is an anatomical cross section showing the diaphragm in place in the vaginal canal, the diaphragm being shown in side elevation.
Figure 3:
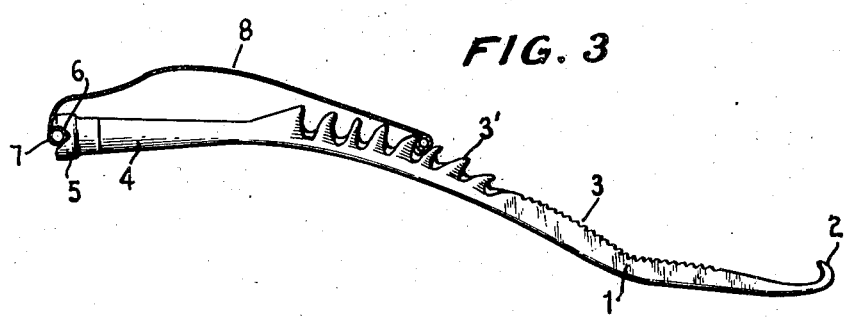
Fig. 3 is a side elevation of the instrument with the diaphragm in place and under tension.
Figure 4:
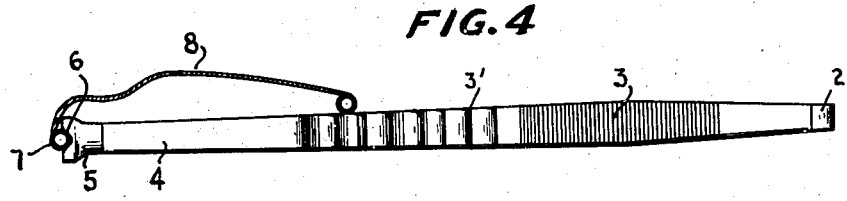
Fig. 4 is a similar view showing the manner in which my improved instrument releases the diaphragm, the diaphragm being released.
Figure 5:
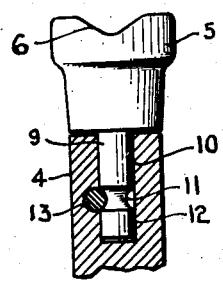
Fig. 5 is an enlarged fragmentary view of the side head.

As shown in the drawing the instrument consists of a horizontal portion 1, terminating in a hook 2, the opposite end 3 of the horizontal portion is arcuate in form. The horizontal portion 1 and a portion of the arcuate part 3 is provided with a plurality of serrations to assist the user in holding the instrument in correct position.

At the top of the arc I provide a plurality of hooks 3' which are placed at spaced intervals for the correct position to receive the various sizes of standard diaphragms. There are numerals formed on the under side of the instrument to indicate the size of the diaphragm for the corresponding hook.

The end 4 of the arcuate portion 3 is provided with a swivel head 5. This head is provided with a groove 6, preferably arcuate in shape, to conform to the curvature of the rim 7, of the diaphragm 8. As shown the head 5 is provided with a reduced neck or stem 9 which telescopes into a central recess 10 formed in the end 4 of the arcuate portion 3 of the instrument. This reduced neck or stem 9, has a circumferential groove 11 formed adjacent its end 12. A pin 13 is inserted adjacent the end 4 of the arcuate portion 3 of the instrument and is in register with the groove 11. The result of this construction is that the head 5, is free to rotate and yet is held securely against longitudinal movement.

Practice has shown that when the head 5 is swiveled, as above described, that on the least rotation of the instrument the diaphragm will actually jump off of the hooks 3' and out of the groove 6 regardless of the tension which is put on it. This is true even if the user should make an error and stretch the diaphragm to the next hook, it will release every time upon the slightest movement of the instrument and release the diaphragm leaving it in the correct position. It will be noted that a hook 2 is provided to facilitate the withdrawal of the diaphragm when it is desired to do so.

While I have described in some detail, the construction of the swivel head, it should be understood that this description is solely to illustrate a concrete embodiment of my invention. It may well be that other forms of construction for swiveling one part to the other may be found useful, and I do not desire to limit myself to the exact details, except as such limitations may appear in the hereinafter appended claims.

Having described my invention, what I regard as new and desire to secure by Letters Patent is:

1. A gynecologic instrument having a hook at one end, a plurality of hooks on the body thereof, one end being swiveled to the other, means to prevent longitudinal movement of said swiveled portion but which permits its free rotation.

2. A gynecologic instrument comprising a horizontal portion having a hook at one end and an arcuate portion at the other, a plurality of hooks at the top of the arcuate portion, there being a central recess in the end of the arcuate portion, a head having an arcuate groove therein, a reduced neck on said head having a circumferential groove formed therein, said neck fitting said recess, a pin in said arcuate portion in register with said circumferential groove whereby said head is held against longitudinal movement but is free to rotate.

3. A gynecologic instrument comprising a horizontal portion having a hook at one end and an arcuate portion at the other, a plurality of hooks at the top of the arcuate portion, a head rotatably mounted in the end of said arcuate portion, and means to prevent the longitudinal movement of said head.

4. A gynecologic instrument comprising a horizontal portion having a hook at one end and an arcuate portion at the other, there being a plurality of serrations on said horizontal portion and a part of the arcuate portion, a plurality of hooks at the top of the arcuate portion, there being a central recess in the end of the arcuate portion, a head having an arcuate groove therein, a reduced neck on said head having a circumferential groove formed therein, said neck fitting said recess, a pin in said arcuate portion in register with said circumferential groove whereby said head is held against longitudinal movement but is free to rotate.

5. A gynecologic instrument comprising a horizontal portion having a hook at one end and an arcuate portion at the other, a plurality of serrations on said horizontal portion and a part of the arcuate portion, a plurality of hooks at the top of the arcuate portion, the end of the arcuate portion comprising a head having a notch formed therein, means to prevent longitudinal movement of said head but which permits its free rotation.

ELLIS H. EDWARDS.